United States Patent [19]

Sallander

[11] 4,258,620
[45] Mar. 31, 1981

[54] TOOL FASTENING MEANS FOR A PRESS

[76] Inventor: Håkan Sallander, Hestravägen 1, S-514 00 Tranemo, Sweden

[21] Appl. No.: 15,140

[22] Filed: Feb. 26, 1979

[30] Foreign Application Priority Data

Apr. 18, 1978 [SE] Sweden ............................ 7804353

[51] Int. Cl.³ .............................................. B30B 15/02
[52] U.S. Cl. ........................... 100/224; 100/DIG. 18; 72/446; 83/698
[58] Field of Search ................... 100/DIG. 18, 229 R, 100/221, 222, 295, 224; 72/446, 448, 481; 83/698, 699, 700, 637; 29/568

[56] References Cited

U.S. PATENT DOCUMENTS

| | | | |
|---|---|---|---|
| 3,111,100 | 11/1963 | Georgeff | 100/224 X |
| 3,111,895 | 11/1963 | Kraft | 100/DIG. 18 |
| 3,455,141 | 7/1969 | Bracco | 100/DIG. 18 |
| 3,638,473 | 2/1972 | McElroy | 100/DIG. 18 |
| 3,965,813 | 6/1976 | Pfost | 100/DIG. 18 |

FOREIGN PATENT DOCUMENTS

939551 10/1963 United Kingdom ............ 100/DIG. 18

Primary Examiner—Billy J. Wilhite
Attorney, Agent, or Firm—Burns, Doane, Swecker & Mathis

[57] ABSTRACT

A fastening device for enabling a tool to be slid as a unit onto a mounting table of a machine such as a press or the like to a predetermined position thereon and for enabling a displacable slide of the machine to engage in its moving direction with the upper part of the tool. For fastening the tool the device comprises slots in the table and guide bars on the lower side of the tool, the guide bars being introducable into and lockable in the slots by means of locking means on the table, and engagement means on the upper side of the tool the engagement means being introducable in the moving direction of the slide into corresponding recesses in the slide and lockable therein by means of locking means on the slide.

12 Claims, 6 Drawing Figures

TOOL FASTENING MEANS FOR A PRESS

This invention relates to a device for fastening or mounting a tool in a machine such as a press, a casting machine, an injection moulding machine or the like, the machine comprising for mounting the tool mounting tables or mounting slides movable relatively each other.

In such machines as presses of different types, injection moulding machines or the like use is made of tools normally comprising two parts, the first part of which is fastened to a stationary mounting table and the second part of which is fastened to a slide movably provided in the machine. The types of tools mentioned are made to a very high degree of precision and require in order not to be destroyed or to function in the way intended a corresponding high degree of precision regarding their mounting on the table and the slide. Further, the parts of the tools must be absolutely immovably secured to the table and the slide respectively and must be exactly aligned relatively each other. Finally, tools of this kind usually are very heavy and can typically have a weight of several hundred kilos. Taking the above in consideration, it is rather apparent that change of tool in a machine of the kind mentioned above is a timeconsuming and responsible work which must be done by well qualified personnel. Though such changes of tools are made by specially trained personnel, they usually may require several hours or even a whole day. This implies that both the machine in which the change of tool is being made and the person normally operating this machine are not in work during a corresponding period of time.

As the time consumption when changing a tool in a machine of the kind mentioned above has since a long time been a well known problem attempts have of course been made to construct appropriate quick-fastening devices for the tools. These quick-fastening devices have suffered from many different drawbacks mainly consisting in the necessity of specially designing the tools for enabling them to cooperate with the clamping means of the quick-fastening devices. This means that tools already made can not be used together with such a quick-fastening device or must the tools be altered or rebuilt to fit the machines equipped with the quick-fastening device.

Other drawbacks present with known quick-fastening devices are the requirement that fastening of the tool can only be effected when the mounting table and the slide are at a predetermined distance from each other, this distance must be kept with very close tolerances to make it possible at all to mount the tool. Other drawbacks present with quick-fastening devices of the prior art have been that the aligning of the parts of the tools relative to each other has not been possible to achieve automatically with a high enough degree of precision. A further drawback present with many types of prior known quick-fastening devices has consisted in the fact that they have been positioned on the upper surface of the mounting table of the press and on the lower surface of the mounting slide and that for their operation they have needed e.g. hydraulic fluid or compressed air. As a result of this the fastening devices and their operating lines have been considered bulky or unconvenient to handle and have made it impossible to use automatic feeding mechanisms to feed the press with work-pieces and remove them therefrom.

Thus, the purpose of the present invention is to provide a fastening device for fastening a tool in a machine of the kind mentioned above the fastening device according to the invention being so designed as to avoid the drawbacks present with the above devices of prior art.

According to the invention this purpose is achieved if a fastening device for fastening a tool in a machine such as a press, a casting machine, an injection moulding machine or the like comprising for mounting the tool tables or slides movable relatively each other is characterized by engagement means provided on the surfaces of the tool facing the table or the slide the engagement means being introducable into corresponding recesses provided in the table or the slide and by locking means provided on the table or the slide for cooperating with the engagement means the locking means being movable between locking positions in locking engagement with the engagement means and positions of non-engagement where the engagement means are movable into and out of the recesses.

In one embodiment of the invention particularly intended for a vertically working press there is according to the invention foreseen that the recesses of the table have the shape of slots into which the engagement means provided as guide bars are introducable in the longitudinal direction thereof and in parallel with the plane of the table and that the engagement means for engaging the slide are introducable into the recesses thereof in the moving direction of the slide. By these measures there is achieved the great advantage that the tool can be placed as a unit, e.g. on brackets fastened to the table and having the same level of height as the upper surface thereof by means of a lifting truck or another lifting device. From this position the tool can be slid to its correct position on the table, use may be made of an antifriction agent or device. In the correct position of the complete tool it is then possible to lower the slide of the press to engage the upper part of the tool.

The embodiment indicated above is further characterized in that the guide bars are defining undercut grooves in which are engaging heads of the locking members provided on the table, the locking members being movable perpendicularly to the plane of the table to accomplish locking and that the engagement means for cooperating with the slide of the press are defining undercut pockets into which are axially introducable heads on the locking members of the slide the heads being engageable with the engagement means by rotation and lockable by displacement perpendicularly to the plane of the slide.

To eliminate the risk that the tool gets loose and possibly destroyed e.g. at failure of current breakage of any pressure line in the machine or the like there is, according to the invention, foreseen that the locking members are movable to their locking positions under influence of spring means and to their non-locking positions under influence of a pressurized fluid.

The invention is now to be described more in detail, reference is being made to the accompanying drawings. On the drawings

Figure 1:
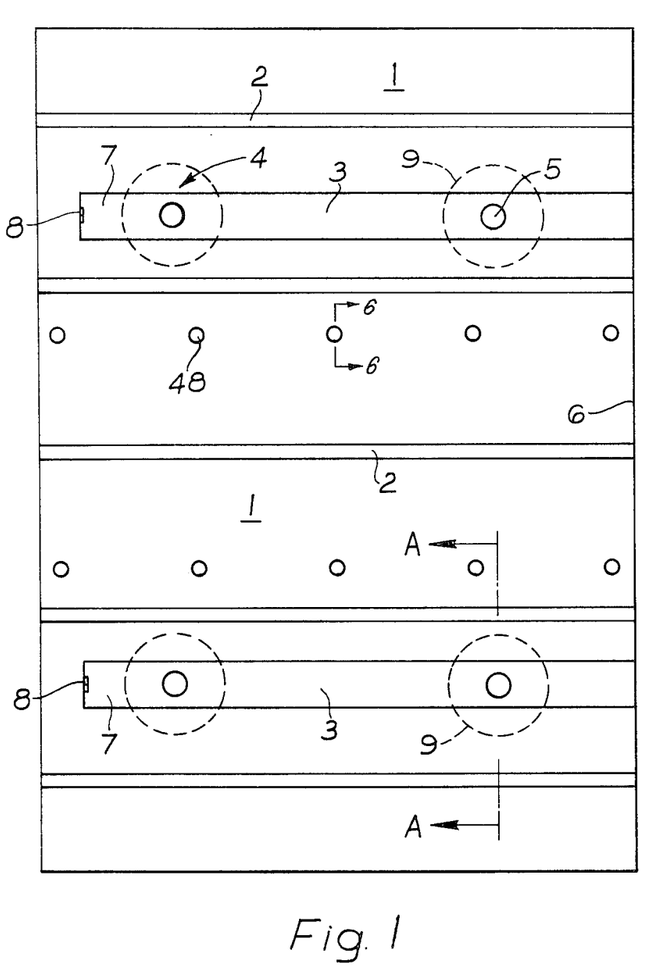
FIG. 1 is showing as an example one embodiment of the invention. The figure is showing from above a table of a vertically working press.

In FIG. 1 there is shown one example of a mounting table of a machine for carrying the invention into effect. It is apparent from the figure that the table 1 in a conventional manner is provided with T-grooves 2 for making it possible to use conventional clamping means in a case where tools are to be used not provided with the engagement means necessary for carrying the invention into effect. It is also apparent that the table 1 is provided with elongated recesses 3 parallel to the T-grooves. From the bottom surfaces of the recesses 3 there are upwardly protruding locking members 4 having heads 5 intended to engage with the engaging means. Preferably, the recesses 3 are of rectangular cross sectional shape and have open ends at one edge 6 of the table 1. The other ends 7 of the recesses 3 are preferably closed or provided with abuttment means. In this area there could also be provided an indicating apparatus the purpose of which will be described below. Further, at 9 there is in FIG. 1 indicated operating devices for locking members 4, these operating devices being situated at the lower side of the table or being built-in into the material of the table.

Figure 2:
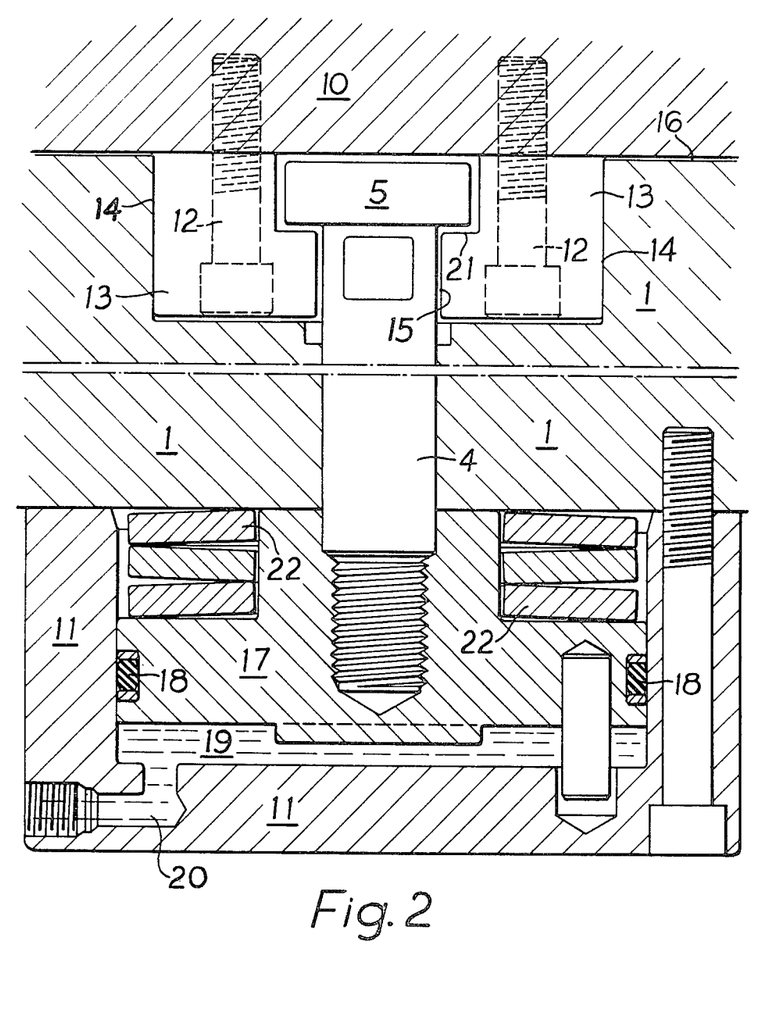
FIG. 2 is a cross sectional view showing the table at a location where the locking means and the operating device thereof is situated.

In FIG. 2 there is schematically shown a cross-section approximately along arrows A—A in FIG. 1. Thus, in FIG. 2 the reference numeral 10 refers to the lower part of the tool, the reference numeral 1 as is the case in FIG. 1 refers to the table and finally the reference numeral 11 refers to a cylinder which is a part of the operating device 9 for the locking member 4.

From FIG. 2 is evident that the lower part 10 of the tool is provided with guide bars 13 fastened thereto by means of screws 12. The vertical outer surfaces 14 are positioned at such distance from each other that the guide bars 13 with a high degree of precision fit in the recesses 3 of the table 1. Though not shown in FIG. 2 it is clear that the lower part 10 of the tool is provided with four guide bars 13, these guide bars being in pairs received in the elongated recesses 3 of the table. The surfaces 15 facing each other on the guide bars 13 are stepped so that the bars between them are defining a T-shaped groove. As an alternative the T-groove and the vertical surfaces 14 may be provided on integrally made members.

As is apparent from FIG. 2 the locking member 4 is extending through the table 1 and is at its upper end provided with a head 5 extending to such a level above the bottom surface of the elongated recess 3 that the upper end surface of the head 5 never protrudes above the upper surface 16 of the table 1. Further, the head 5 is of such dimensions that it can be received in the T-shaped groove defined by the guide bars 13 and the lower part 10 of the tool.

As is clearly evident from the drawing the locking member 4 is extending through the table 1 and is at its lower end connected to a piston 17 received in a cylinder 11. The piston is provided with sealing rings 18 of adequate design for sealing the space 19 between the lower side of the piston and the bottom of the cylinder. Between the upper side of the piston and the lower side of the table 1 there are provided spring washers 22 of a suitable number, the spring washers urging the piston and the locking member 4 downwardly with a considerable force (in the range of 5–10000 Kp). To counteract the force of the springs 22 the cylinder 11 has an inlet 20 for fluid under pressure by means of which the piston 17 can be displaced upwardly so that the head 5 of the locking member 4 can be brought to a position (shown in FIG. 2) in which no engagement occurs between the lower side of the head and the stepped surfaces 21 of the guide bars 13. Inversly, it is possible by reducing the pressure in the space 19 to move by means of the spring washers 22 the locking member 4 downwardly so that the lower side of the head 5 is pressed against the stepped surfaces 21 of the guide bars with the force mentioned above. In this condition the lower part 10 of the tool will be pressed with great force against the table 1 and will securely be held in this position.

Though not shown on the drawings the slide of the press which in the machine described so far is positioned vertically above the table of the press and which is displaceable in the vertical direction relative to the table by means of a conventional fluid-actuated ram 42 (FIG. 4), the table, may on its lower side be provided with T-grooves corresponding to the T-grooves 2 on the table. However, the slide is not provided with any elongated recesses corresponding to the recesses 3 of the table.

Figure 3:
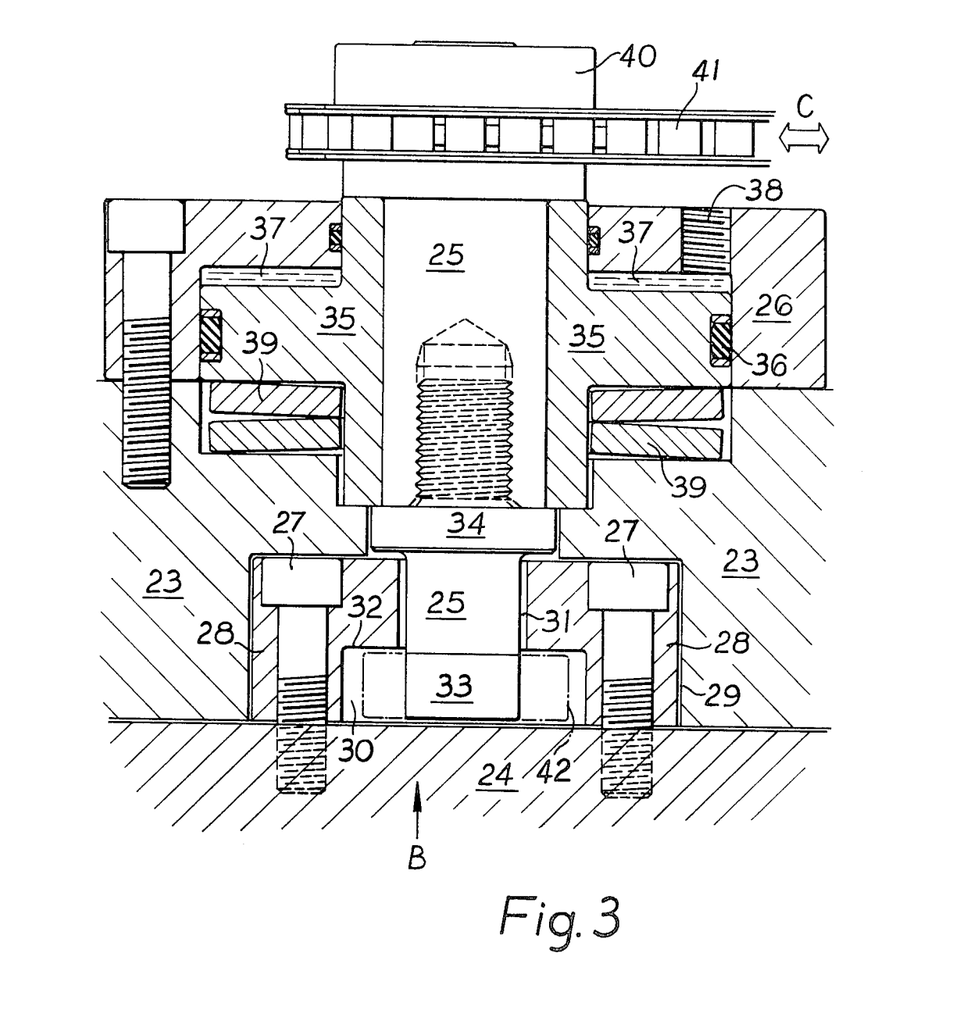
FIG. 3 is a corresponding cross sectional view showing the slide of the press at a location where the locking means thereof is situated.

In FIG. 3 there is shown a cross sectional view of the slide of the press corresponding to the cross sectional view A—A of the table. Thus, in FIG. 3 the reference numeral 23 refers to the slide of the press, the reference numeral 24 refers to the upper part of the tool while the reference numeral 25 refers to the locking means of the slide and the reference numeral 26 refers to a cylinder being a part of the locking means 25.

Figure 5:
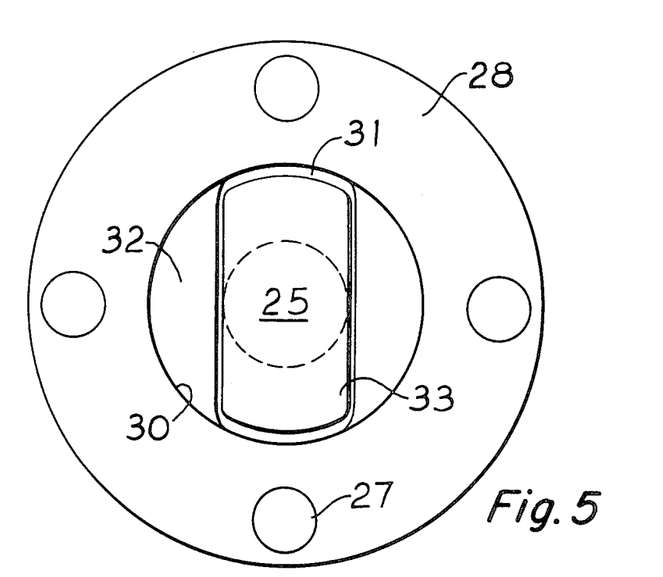
FIG. 5 is showing from below the head on one of the locking means of the slide and an engagement means intended to be mounted on the upper part of the tool.
Figure 6:
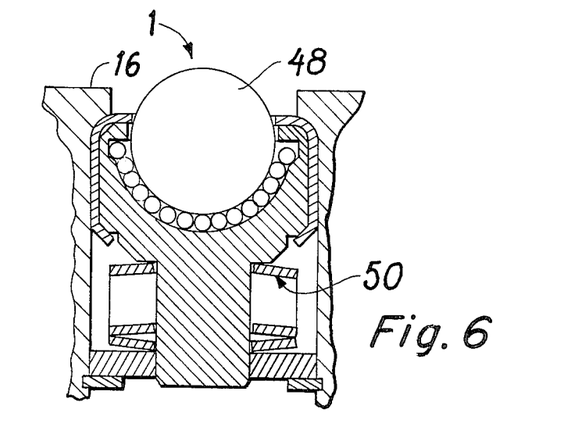
FIG. 6 is a cross-sectional view of a spring biased roller taken along line 6—6 in FIG. 1.

According to the invention there is on the upper surface of the upper part 24 of the tool fastened by means of screws a cylindrical member 28 which is shown in detail in FIG. 5, seen in the direction of arrow B. With a certain play the cylindric member 28 can be received in a corresponding bore 29 in the slide 23 and is internally provided with a cylindrical recess 30 having connection with the upper surface of the cylindric member 28 via an elongated opening 31. The recess 30 has abuttment surfaces 32 defining the upper end thereof.

As is evident from FIG. 3 the locking means 25 extends right through the slide 23 and is in its lower end provided with a head 33 having a shape corresponding to the shape of the elongated opening 31. However, the dimensions of the head 33 are slightly smaller than the dimensions of the opening so that the head can be inserted through the opening and received in the recess 30.

At a mid-position of the locking member 25 there is provided a protruding flange 34 against the upper surface of which is abutting a piston 35 displacable in a cylinder 26 and sealed thereto by means of sealing rings 36. The end wall of the cylinder 26 and the upper surface of the piston 35 define a space 37 which can be exposed to pressure by means of a pressurized fluid supplied via an inlet 38 whereby the piston is pressed downwardly. Between the lower surface of the piston 35 and the upper surface of the slide 23 there is provided spring washers 39 to a suitable number. The spring washers 39 are urging the locking member 25 upwardly with a considerable force when the space 37 is released of pressure. Inversly, it is possible to displace the piston 35 downwardly against the action of the springs 39 by supplying fluid under pressure to the space 37. This displacement in vertical direction will also impart a corresponding displacement to the locking member 25 and the head 33 thereof.

The piston has in a central portion thereof a through boring through which extends a portion of the locking member 25, the member being rotable relative to the piston 35. The upper end of the locking member 25 is provided with a sprocket wheel 40 the lower surface of which abuts the upper surface of a central hub portion of the piston 35. By displacing the chain 41 as indicated by arrow C it is possible to rotate the sprocket wheel 40 and the locking member 25 so that the head 33 thereof is rotated to a position shown in broken lines 42 in FIG. 3. In this position the upper surfaces of the head 33 are disposed beneath the abutment surfaces 32 of the cylindrical member 28 (the head has been rotated 90° from the position shown in FIG. 5). By displacing the locking member 25 upwardly in this position of rotation the head 33 will engage the cylindrical member 28 whereby the upper part 24 of the tool is pressed by the force excerted by the springs 39 to a fastening engagement with the lower surface of the slide 23.

In the position shown in FIGS. 3 and 5 the head 33 of the locking member 25 can be introduced into and withdrawn out from the elongated opening 31 and the cylindrical recess 30 by displacing vertically the slide relative to the upper part 24 of the tool.

Figure 4:
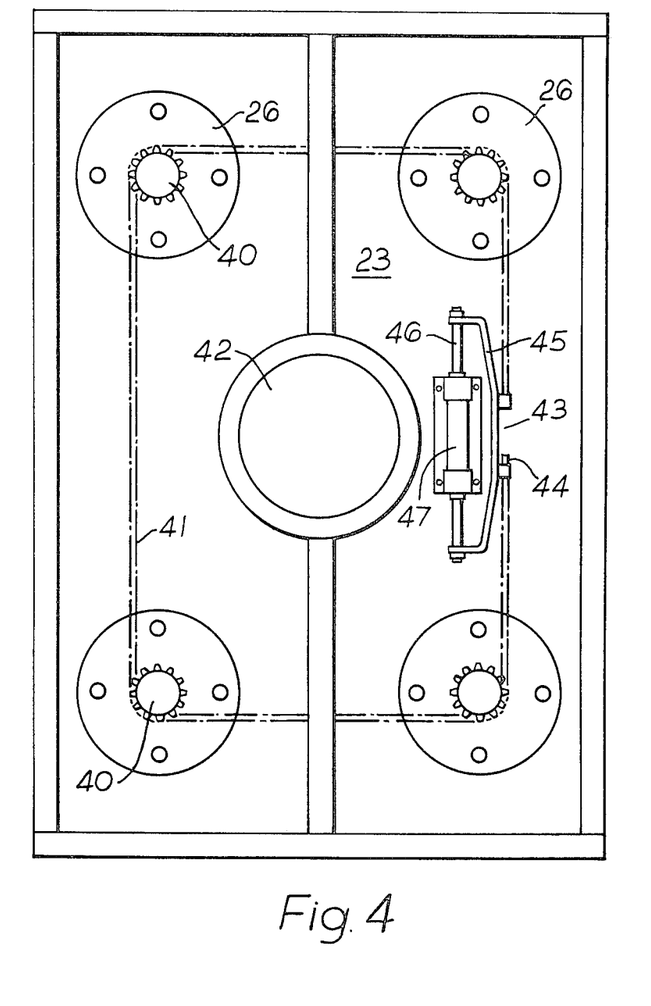
FIG. 4 is showing schematically from above the slide and the operating means of the locking means.

To achieve the movement of the chain 41 as indicated by arrow C the upper side of the slide 23 is equipped with the devices shown in FIG. 4. Thus, this figure shows four cylinders 26 on the upper surfaces of which the sprockets 40 are indicated meshing with the chain 41 which is extending in a loop around the four sprockets. In an interruption 43 in the chain 41 the ends thereof are fastened to a yoke 45 by means of at least one adjustment member 44 the yoke being fastened to the ends of a piston rod 46 which extends through a pneumatic or hydraulic cylinder 47. By supplying pressurized fluid to the cylinder 47 it is possible to displace the piston rod 46 longitudinally and thereby to impart rotation to the four sprocket wheels 40. Further the design is such that vertical displacement of the chain 41 caused by the vertical displacement of the pistons 35 in the cylinders 26 is taken up by turning the yoke 45 around the longitudinal axis of the piston rod 46.

The inventive device works in the following manner:

When mounting a tool in the press described above the tool can be transported from a storage place to a position at the same level as the table 1. This could either be achieved by means of a stationary provided transporting equippment or by a lifting truck or the like. In the latter case the tool is suitably placed on two protruding brackets or arms fastened to the table in alignment with the two rows of roller members 48 which protrude somewhat above the upper surface of the table but which also can be depressed into it. Preferably, in this alternative the brackets are also provided with corresponding roller members by means of which the tool easily can be displaced to such a position that the guide bars 13 fastened to the lower side of the tool are aligned with the elongated recesses 3 in the table. Before the tool is rolled onto the table 1 by means of the roller members 48 there must be assertained that the locking members 4 of the table are in their upper, free positions which is accomplished by supplying pressurized fluid to the spaces 19 below the pistons 17 so that the spring washers 22 are compressed. Preferably, this can be done completely automatically when the hydraulic system of the machine is set for tool exchange. When the locking members 4 are in their upper positions it is possible to manually without any considerable effort slide the tool onto the table 1 while the tool is guided to an exactly aligned position on the table by engagement between the side surfaces of the guide bars 13 and the elongated recesses 3. When the tool has reached such a position that the inner ends of the guide bars 13 are engaging the indication means 8 preferably located at the inner ends of the recesses 3 it is made possible or is automatically arranged that the pressure present in the spaces 19 is relieved to such a degree that the spring washers 22 are displacing the locking means 4 downwardly so that the lower portion of the tool is pressed against the table to a locking engagement therewith. To enable this the roller members 48 are spring loaded by springs 50 so that they can be depressed into their seats. When the spaces are completely relieved of pressure the slide 23 is lowered, preferably automatically, so that the cylindrical members 28 on the upper side of the tool is received in the recesses 29 in the slide. At this moment the heads 33 of the locking members 25 of the slide are rotated to such positions that they can be introduced through the elongated openings 31 in the cylindric members 28. Then, when a certain pressure has been achieved in the main cylinder of the press (the cylinder operating the slide) there is automatically achieved or is made possible manual operation of the cylinder 47 on the upper side of the slide so that the heads 33 of the locking members 25 are rotated 90°. Then the pressure present in the spaces 37 is relieved so that the spring washers 39 with great force are urging the locking members 25 upwardly said force via the upper surfaces of the heads 33, the abutment surfaces 32 of the cylindric members 28 being transmitted to the upper part 24 of the tool so that said part is pressed to a locking engagement with the lower side of the slide 23. When the spaces 37 are completely relieved of pressure the tool has been mounted in the press and this is ready for operation.

When removing the tool from the press the working order is the opposite. Thus, the tool is first closed with the last workpiece left in the tool to guarantee centering of the two tool parts 10 and 24 when mounting the tool next time. When the tool has been closed the spaces 37 are exposed to pressure whereby the pistons 35 are pressed downwardly and the heads 33 of the locking members 25 are rotated to their free positions (FIG. 5) relatively the abutment surfaces 32. Then the slide 23 of the press is elevated to its uppermost position and also the spaces 39 in the cylinders 11 are exposed to pressure so that the pistons 17 and thus the locking members 4 are displaced upwardly to their free positions. When this displacement is finished the spring loaded roller members 48 will lift the tool as a unit a short distance above the table 1 so that the tool easily can be slid out onto the brackets carried by the roller members.

The invention may also with great advantages be carried into effect in injection moulding machines. In this alternative the fastening surfaces of the stationary table and the slide are not horizontal but vertical which implies that the recesses 3 in the table should have their open ends facing upwardly. The method of changing tool is in other respects quite analogous. Thus, the tool is lowered by means of a jack or other suitable lifting device in such a manner that the tool is sliding along the surface of the stationary table and is guided by cooperation between the guide bars and the elongated recesses provided in the table.

Naturally the invention also may be carried into effect in other types of machines where a tool with a high degree of precision must be fastened. Thus, a tool for pressure die casting can with great advantages be fastened in a pressure die casting machine. Further, welding fixtures of different kinds can be mounted in automatic lifting- and operating machines or the like.

The invention can be modified within the scope of the following claims. Thus, it is possible to use in the table and the slide a number of locking means other than four e.g. two, six, eight etc. If required these locking means can of course be arranged in more than two rows, e.g. three or four if the table and the slide are of big dimensions. Further, the elongated recesses in the table may have both their ends open the indication means in such a case having a construction different from that mentioned above.

According to the invention it is also possible to achieve the rotation of the locking members of the slide in a manner different from what has been described. Thus, it is possible to use a separate operating device for each of the locking means on the slide said operating device may be designed in any way e.g. as a cylinder, a solenoid or the like.

According to the invention it is also possible to convert a machine already present if it is provided on its table and slide with additional plates incorporating the fastening device of the invention. Such plates will also serve as new tool fastening surfaces of the machine.

I claim:

1. A machine of the type comprising a two-part tool, a first part of said tool being mounted on a first surface of a first mounting member and a second part of said tool mounted on a second mounting member, means for producing relative movement between said first and second mounting members in a direction of movement toward and away from one another to selectively engage and separate said tool parts, said first surface and said first tool part including cooperating guide means enabling said first tool part to be moved along said first surface to a predetermined position thereon, said first mounting member and said first tool part including first cooperating clamping means disposed internally of said first tool part and said first mounting member for firmly clamping said first tool part against said first surface in said predetermined position, said second mounting member and said second tool part including cooperating engagement means which are brought together to a mating position in said direction of movement, said engagement means including second cooperating clamping means movable to a clamping relationship with said engagement means in said mating position, to clamp said second tool part to said second mounting member.

2. Apparatus according to claim 1, wherein said first tool part comprises a second surface which is to press against said first surface by said first clamping means, said cooperating guide means including first recess means in said first surface, and first projecting means projecting from said second surface and received in said first recess means, the latter being countersunk inwardly of said first surface, said second mounting member including a third surface parallel to said first surface, said cooperating engagement means comprising a second projecting means projecting into second recess means in said third surface which is countersunk inwardly of said third surface, and said second clamping means being countersunk inwardly of said third surface.

3. Apparatus according to claim 2, wherein said guide means includes parallel slots formed in said first surface and said first projecting means comprises pairs of guide bars projecting from said second surface, each pair of guide bars being insertable into one of said slots, said slots including abutment means for locating said first tool part in said predetermined position.

4. Apparatus according to claim 3, wherein each said pair of guide bars defines an undercut groove, said first clamping means including a head received in said undercut groove and movable in a direction parallel to the plane of said first surface.

5. Apparatus according to claim 1, wherein said first mounting member includes a plurality of spring biased rollers which engage and support said first tool part as it is moved along said first mounting member.

6. Apparatus according to claim 1, wherein said first cooperating guide means comprises a slot formed in one of said first mounting member and said first tool part and a projection carried by the other thereof, said slot being open at one end to enable said first tool part to be inserted into said first mounting member and slid therealong to said predetermined position.

7. Apparatus according to claim 1, wherein said cooperating clamping means are arranged to apply clamping forces in said direction of movement and, when in a released condition, enable said first tool part to be slid freely from said first mounting member.

8. Apparatus according to claim 1, wherein said cooperating guide means comprises at least one slot in said first surface and at least one associated projection depending from said first tool part and insertable in said slot, said first clamping means disposed in said slot and arranged, when in a non-clamping condition, to allow unobstructed travel of said first tool part along said first supporting member and, when in a clamping condition to act against said projection to clamp said first tool part to said first supporting member.

9. Apparatus according to claim 1, wherein said guide means being configured to receive said first tool part with precision fit, said engagement means being configured to provide for slight movement to said second tool part relative to said second supporting member.

10. A machine of the type comprising a two-part tool, a first part of said tool being mounted on a first surface of a first mounting member and a second part of said tool mounted on a second mounting member, means for producing relative movement between said first and second mounting members in a direction of movement toward and away from one another to selectively engage and separate said tool parts, said first surface and said first tool part including cooperating guide means enabling said first tool part to be moved along said first surface to a predetermined position thereon, said first mounting member and said first tool part including first cooperating clamping means for firmly clamping said first tool part against said first surface in said predetermined position, said second mounting member and said second tool part including cooperating engagement means which are brought together to a mating position in said direction of movement, said engagement means including second cooperating clamping means movable to a clamping relationship with said engagement means in said mating position, to clamp said second tool part to said second mounting member, said first tool part comprising a second surface which is to press against said first surface by said first clamping means, said cooperating guide means including first recess means in said first surface, and first projecting means projecting from said second surface and received in said first recess means, the latter being countersunk inwardly of said first surface, said second mounting member including a third surface parallel to said first surface, said cooperating engagement means comprising a second projecting means projecting into second recess means in said third surface which is countersunk inwardly of said third surface, and said second clamping means being countersunk inwardly of said third surface.

11. A machine of the type comprising a two-part tool, a first part of said tool being mounted on a first surface of a first mounting member and a second part of said tool mounted on a second mounting member, means for producing relative movement between said first and second mounting members in a direction of movement toward and away from one another to selectively engage and separate said tool parts, said first surface and said first tool part including cooperating guide means enabling said first tool part to be moved along said first surface to a predetermined position thereon, said first mounting member and said first tool part including first cooperating clamping means for firmly clamping said first tool part against said first surface in said predetermined position, said second mounting member and said second tool part including cooperating engagement means which are brought together to a mating position in said direction of movement, said engagement means including second cooperating clamping means movable to a clamping relationship with said engagement means in said mating position, to clamp said second tool part to said second mounting member, said first cooperating guide means comprising a slot formed in one of said first mounting member and said first tool part and a projection carried by the other thereof, said slot being open at one end to enable said first tool part to be inserted into said first mounting member and slid therealong to said predetermined position.

12. A machine of the type comprising a two-part tool, a first part of said tool being mounted on a first surface of a first mounting member and a second part of said tool mounted on a second mounting member, means for producing relative movement between said first and second mounting members in a direction of movement toward and away from one another to selectively engage and separate said tool parts, said first surface and said first tool part including cooperating guide means enabling said first tool part to be moved along said first surface to a predetermined position thereon, said first mounting member and said first tool part including first cooperating clamping means for firmly clamping said first tool part against said first surface in said predetermined position, said second mounting member and said second tool part including cooperating engagement means which are brought together to a mating position in said direction of movement, said engagement means including second cooperating clamping means movable to a clamping relationship with said engagement means in said mating position, to clamp said second tool part to said second mounting member, said cooperating guide means comprising at least one slot in said first surface and at least one associated projection depending from said first tool part and insertable in said slot, said first clamping means disposed in said slot and arranged, when in a non-clamping condition, to allow unobstructed travel of said first tool part along said first supporting member and, when in a clamping condition to act against said projection to clamp said first tool part to said first supporting member.

* * * * *